(12) United States Patent
Smithson et al.

(10) Patent No.: US 6,260,782 B1
(45) Date of Patent: Jul. 17, 2001

(54) RETRACTOR SPOOL

(75) Inventors: Alan G. Smithson; David Blackadder; Andrew Park; John Taylor; Carlo Martellini; Andrew Wood; Martyn Palliser, all of Cumbria (GB)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/117,163

(22) PCT Filed: Jan. 24, 1997

(86) PCT No.: PCT/GB97/00220

§ 371 Date: May 20, 1999

§ 102(e) Date: May 20, 1999

(87) PCT Pub. No.: WO97/27088

PCT Pub. Date: Jul. 31, 1997

(30) Foreign Application Priority Data

Jan. 24, 1996 (GB) .............................................. 96 01 352
Aug. 15, 1996 (GB) .............................................. 96 17 137
Nov. 20, 1996 (GB) .............................................. 96 24 139

(51) Int. Cl.$^7$ ...................................................... B65H 75/48
(52) U.S. Cl. ................... 242/379.1; 242/376; 242/613.4; 242/577.1; 297/472
(58) Field of Search .............................. 242/376, 379.1, 242/587.1, 613, 613.2, 571, 577.1, 613.4, 613.5; 297/472; 280/805, 806

(56) References Cited

U.S. PATENT DOCUMENTS

| 3,927,846 | 12/1975 | Meissner . |
|---|---|---|
| 3,970,265 | 7/1976 | Köpke et al. . |
| 4,323,205 | 4/1982 | Tsuge et al. . |
| 4,555,075 | * 11/1985 | Schmidt et al. . |
| 4,811,913 | * 3/1989 | Fernandez . |
| 5,050,815 | * 9/1991 | Doty et al. . |
| 5,297,752 | * 3/1994 | Brown et al. . |

FOREIGN PATENT DOCUMENTS

| 0 297 537 | 1/1989 | (EP) . |
|---|---|---|
| 2 190 016 | 1/1974 | (FR) . |
| 2 273 693 | 1/1976 | (FR) . |
| 1 324 667 | 7/1973 | (GB) . |
| 1 354 804 | 6/1974 | (GB) . |
| 1 440 232 | 6/1976 | (GB) . |
| 1 464 090 | 2/1977 | (GB) . |
| WO 97/02162 | 1/1997 | (WO) . |

* cited by examiner

Primary Examiner—William A. Rivera
(74) Attorney, Agent, or Firm—Markell Seitzman

(57) ABSTRACT

Force limitation in retractors is needed to avoid injury to an occupant from the seat belt itself particularly at high crash impact loads. The invention provides a seat belt retractor comprising a spool including force limiting means for allowing further payout of the seat belt webbing after the spool has locked, under the influence of an occupant's forward momentum in the crash condition. In one aspect the force limiting means is provided by a plurality of fins provided on the outer surface of the spool, each fin having a section which extends in a generally radial direction and a section which extends circumferentially, the circumferentially extending section of one fin overlapping the circumferentially extending section of an adjacent fin and supported by the radial extending section of that adjacent fin, so that a force tending to tighten the webbing on the spool, acts in a direction to crush the radial sections of the fins and to slide the circumferential sections over each other, thus reducing the effective outer circumference of the spool. In another aspect the force limiting means comprises an energy absorbing member connecting the spool to the spool shaft, the connection being rigid below a predetermined force, and above the predetermined force there being relative rotation of the spool with respect to the spool shaft to allow pay-out of belt webbing.

4 Claims, 11 Drawing Sheets

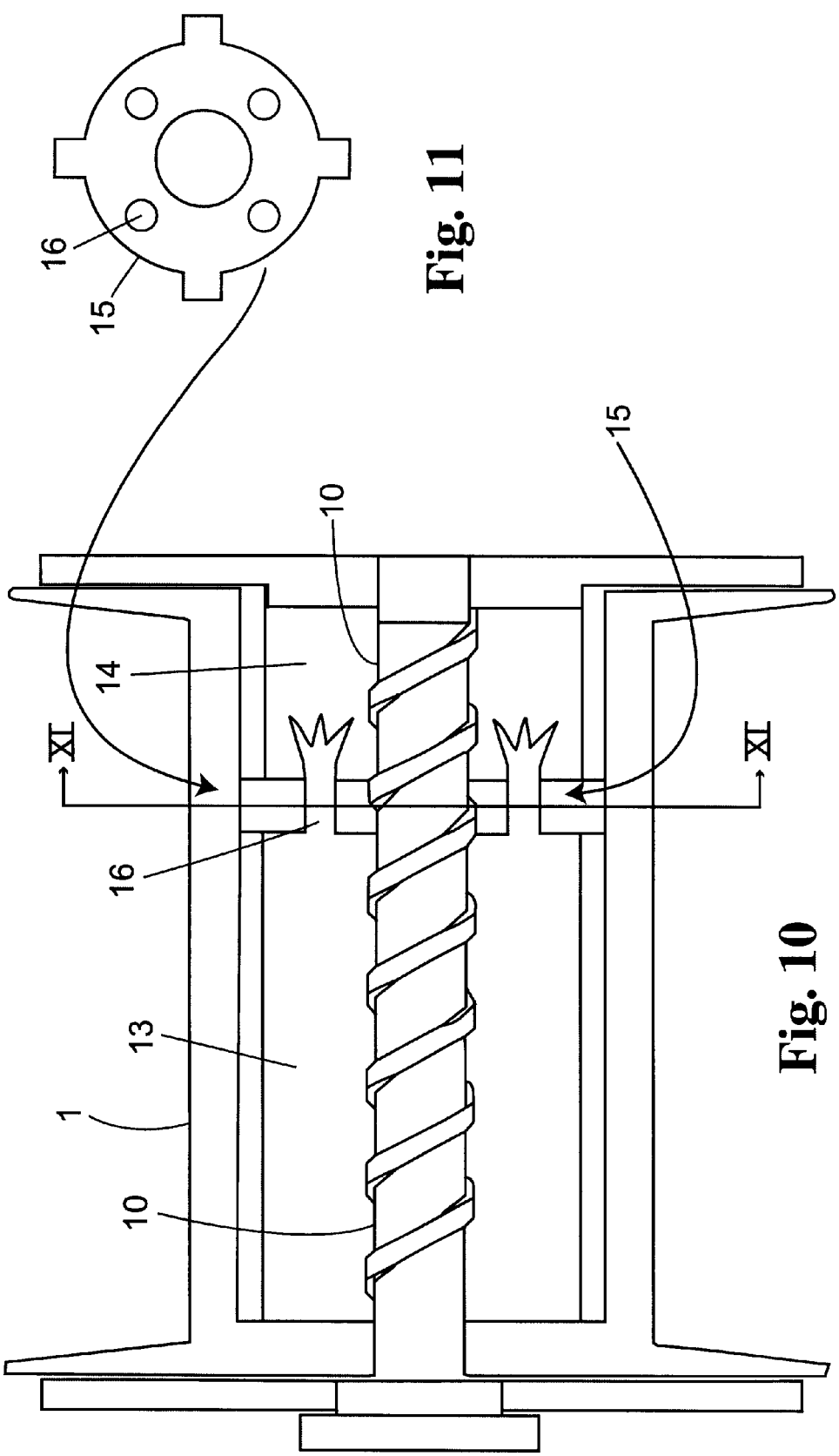

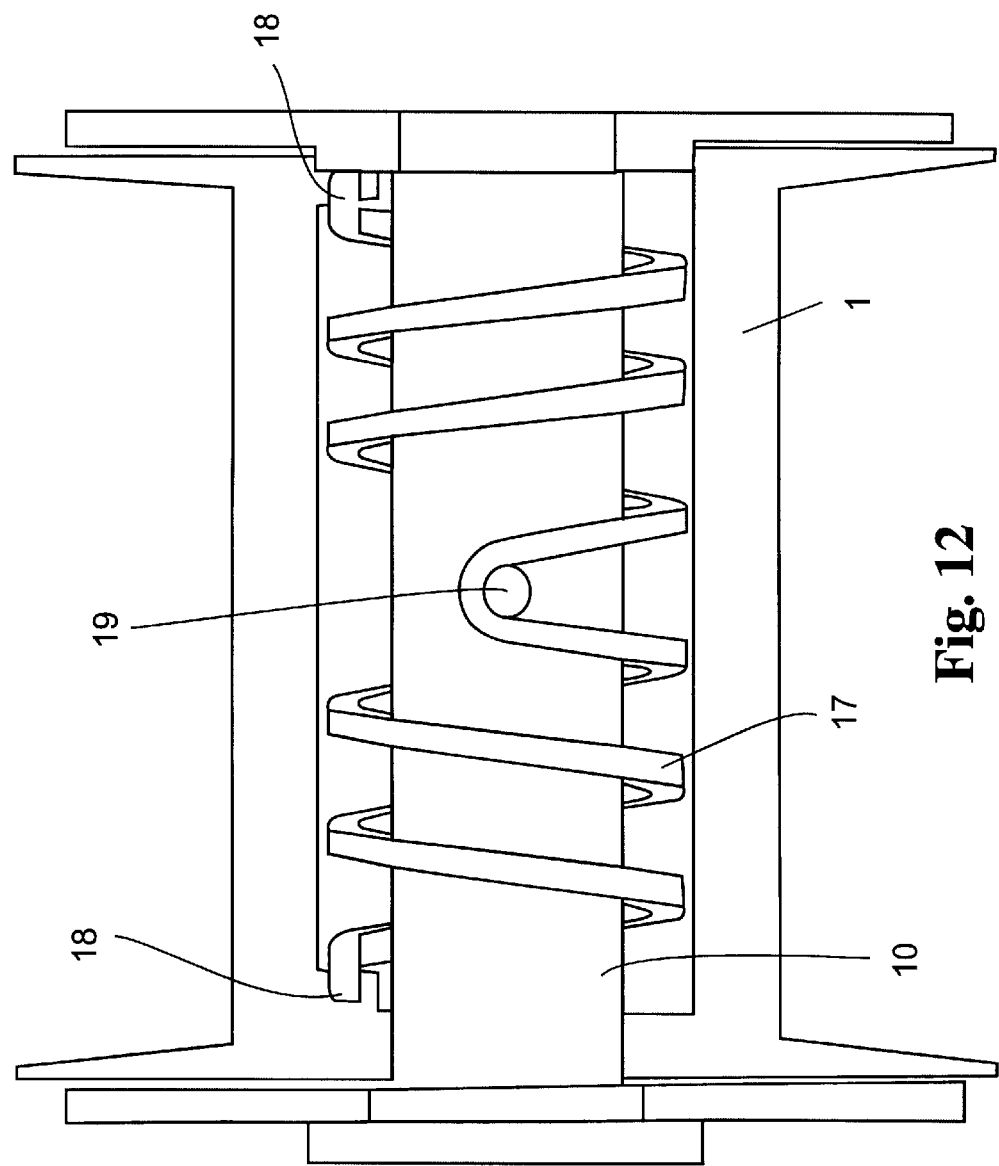

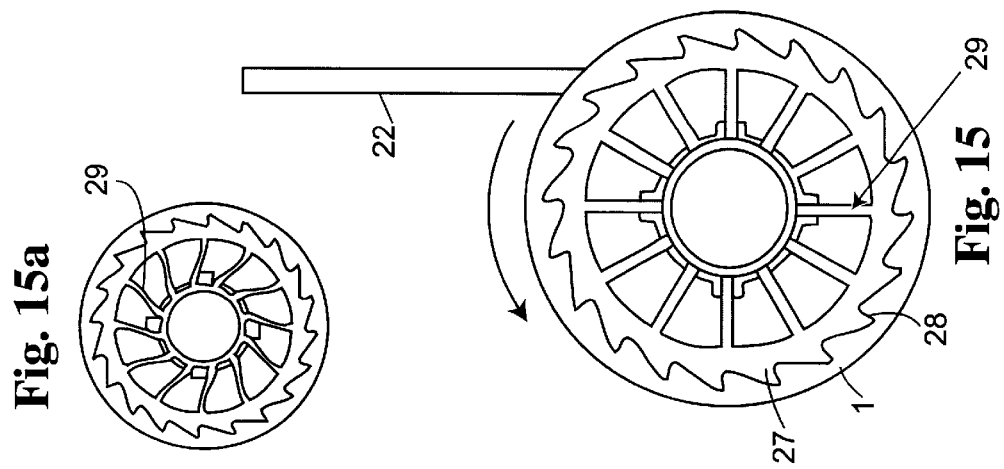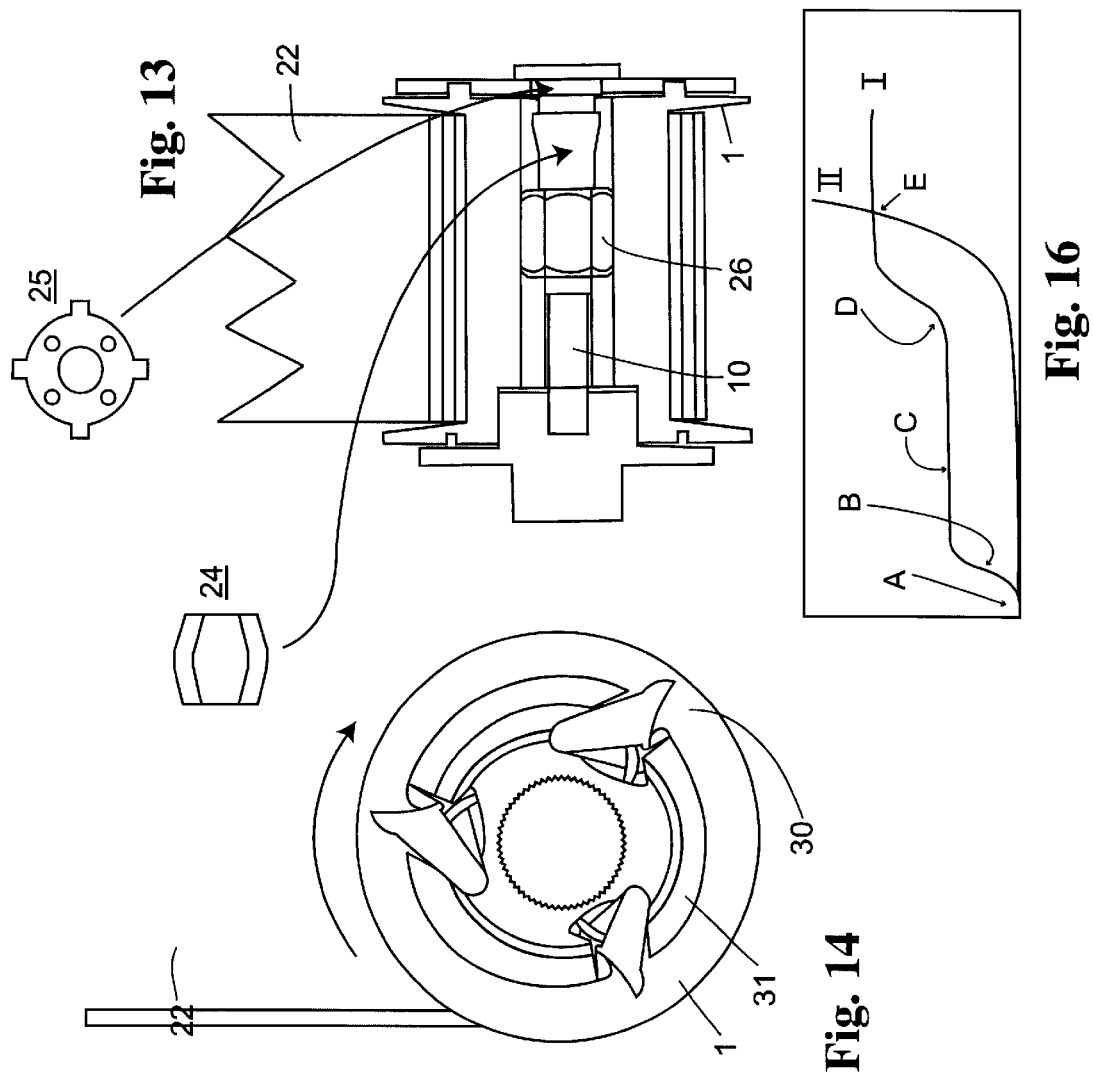

RETRACTOR SPOOL

DESCRIPTION

The present invention relates to a retractor spool for a vehicle safety restraint.

A retractor spool generally consists of a cylindrical bobbin with a circular cross-section. Seat belt webbing is attached to and wound around the spool and the spool is mounted on a spool shaft to be rotatable in the retractor to wind in webbing under action of a retractor spring and to pay out webbing under the influence of relatively gentle forwardly directed inertia of a vehicle occupant, for example to allow for normal movement associated with vehicle occupancy such as reaching forwards to activate in-car controls (for a radio or a window) or to reach a glove compartment or door pocket. In the event of a crash situation, the more extreme momentum of the occupant activates a crash sensor which locks the spool against rotation and thus prevents forward motion of the occupant and injury due to occupant collision with the interior fixtures of the vehicle such as the steering wheel, dashboard or windscreen.

However, this sudden locking of the seat belt spool under crash conditions can itself sometimes cause injury to the occupant due to sudden impact of the torso with the belt webbing. This is particularly true in high velocity crashes.

In recent years this problem has been recognized and some solutions proposed.

One solution has been to rely on natural elongation of the webbing under high loads, and on the spool film effect (natural tightening of the webbing wound on the spool under high loads), to produce a load limiting effect.

Another known proposal has been described in EP 0 297 537 A, wherein force limiting is effected by interposing a plastically deformable member between the spool and the innermost winding of the belt webbing or by interposing an elastic member such as a spring rubber member or resin member between an end flange of the spool and the latch plate. This allows a pay-out of webbing in proportion to the inertia of the vehicle occupant at the moment of a crash condition being sensed. This pay-out lessens the otherwise severe restraining forces on the occupant at high vehicle speeds especially during the initial moments of the crash. It thus reduces the injurious effects of the seat belt in a crash.

The present invention proposed improved load limiting arrangements for retractors.

According to one aspect of the present invention there is provided a seat belt retractor comprising:

a spool mounted on a spool shaft for rotation in the retractor, a length of seat belt webbing wound on the spool for retraction or pay-out depending on the rotation direction of the spool;

means for locking the spool shaft against rotation when a crash condition is sensed;

force limiting means for allowing further pay-out of the seat belt webbing after the spool shaft has locked, under the influence of an occupant's forward momentum in the crash condition, wherein the force limiting means is provided by a plurality of fins provided on the outer surface of the spool, each fin having a section which extends in a generally radial direction and a section which extends circumferentially, the circumferentially extending section of one fin overlapping the circumferentially extending section of an adjacent fin and are supported by the radial extending section of that adjacent fin, so that a force tending to tighten the webbing on the spool, acts in a direction to crush the radial sections of the fins and to slide the circumferential sections over each other, thus reducing the effective outer circumference of the spool.

The circumferentially extending fin parts may be stepped so as to provide a stop for the sliding movement of the fins and to provide a minimum crushed spool size, i.e. a maximum load limiting force, at which pay out is allowed.

The fins may be fixed in place, in the undeformed spool, by shear elements. This provides a minimum force at which the load limiting comes into effect. It also provides a visual indication of when the force limiting has been deployed, alerting the owner to effect the necessary replacement for safety reasons before further use of the retractor.

The shear elements may be formed of small ribs, pins or clips which fracture at a predetermined load, and with suitable choice of material an aural signal may also be generated.

According to a second aspect of the invention the force limiting means comprises an energy absorbing member connecting the spool to the spool shaft, the connection being rigid below a predetermined force, and above the predetermined force there being relative rotation of the spool with respect to the spool shaft to allow pay out of belt webbing.

According to the second aspect of the invention the energy absorbing member of the force limiting means may comprise a slipping clutch connecting the spool to the spool shaft co-axial of the spool.

In one embodiment the spool is hollow and the clutch comprises a plurality of interposed clutch plates extending alternately, on the one hand inwardly from the inside surface of the spool casing, and on the other hand outwardly from the spool shaft, within the hollow spool.

In a second embodiment the slipping clutch comprises co-operating clutch plates at one or both ends of the spool shaft by means of which the spool is clamped.

The force limiting load is determined by the slipping torque of the clutch plates and this may be controlled by the position of a nut on the spool shaft acting to apply tension to the clutch, either directly or via a spring or one or more Belville washers between the nut and the clutch, or an elastically or plastically deformable member.

The clutch plates may be generally planar with surfaces having circular inter-connecting ribs, for example of trapezoidal or sinusoidal profile. Alternatively a cone clutch design as is well known in the art could be used, at one or both ends of the spool shaft.

Preferably a non-circular hole is used to avoid the clutch plates spinning on the shaft.

According to a preferred embodiment of the second aspect the nut is linked to the spool so that as the clutch slips under load limiting conditions, allowing rotation of the spool relative to the shaft, then the nut rotates and moves along the shaft, increasing or decreasing the tension on the clutch plates accordingly. This acts as an automatic load control feedback system.

Another variation of the second embodiment is to use a friction clutch whereby friction material is arranged between the spool and the clutch plate at one or both ends of the spool. The clutch plate may be a combined locking ratchet or a separate component. The friction coefficient of the friction material will control the slipping torque and thus the limiting load. The material could be keyed, attached or chemically bonded to one of the adjacent surfaces. The flexibility and surface properties of the material help to compensate for any manufacturing variations in the adjacent surfaces. A suitable friction material would be the proprietary material Jurid® 850 or 851.

The friction material may be tensioned by a locking nut on the spool shaft and/or by washers, for example Belville washers or an elastically or plastically deformable member.

According to a third embodiment of this aspect of the invention, the energy absorbing member of the force limiting means may comprise a deformable member. This may be a crushable or deformable tube mounted on the rotation shaft of the spool and means for applying a compressive load to the deformable tube axially with respect to the shaft, when a high load is applied to the retractor under crash conditions. The tube may be mounted on the shaft at one end of the spool, or within a hollow spool.

Preferably the deformable tube is deformable outwardly in a radial direction under an axial compressive load, for example, one end may splay radially outward or the middle region of the tube may bulge outward.

The compressive load may be applied by a nut abutting the deformable tube and mounted on the spool shaft, and which rotates to apply force to the deformable tube when a high crash load is detected. It can also be adjusted by the pitch and type (e.g. square or sinusoidal) of the threading on the bolt and nut.

According to a preferred embodiment the maximum and minimum levels of load limiting are definable. This may be achieved by a suitable choice of material, shape and size of the deformable tube.

Preferably a bearing disc is provided to rotate with the spool and substantially remove torque from the crushable tube member. This gives a more predictable load limiting curve.

This load limiting arrangement may be used with a single-sided locking retractor, or with a double-sided locking retractor.

Double-sided locking may be achieved by lock dogs at each end of the retractor connected by a rotatable shaft. Preferably however it is achieved by building in a controlled amount of compliance at the mechanical end of the spool and using relative rotation of the spool relative to the spool shaft during load limiting to lock the other end of the spool, which for example would be the pretensioner end in a retractor where a pretensioner is fitted.

This avoids the long tie bar otherwise needed to connect two lock dogs for double-sided locking and improves the webbing capacity of the spool.

The invention is particularly applicable to the load limiting retractor known as the constant force retractor and described in co-pending International application PCT/US95/15002, publication WO 96/16843.

When a pretensioner is fitted it is preferably to avoid the pretensioner loads being transmitted through the load limiter. This can be achieved using shear pins connecting the spool to the ratchet at the spool mechanism end. During load limiting the shear pins break and bring a clutch into engagement for the pretensioner. This ensures that the pretensioning load applied to the belt is less than the load limiter threshold.

Alternatively, according to the second aspect of the invention the deformable member may be deformable material contained as an insert in one or more hollow discs mounted between the spool and the shaft, coaxial with the shaft. Each disc can be mounted so that the deformable material insert at one side co-operates with an adjacently mounted ball restrained in a socket. In the spool at rest position and in normal use, the ball sits in a recess in the deformable material. Under load limiting conditions, there is relative rotation between the spool and the shaft and hence between the insert and the ball, and the ball deforms the insert material.

Preferably several discs are provided each having the deformable insert on one side and the ball on the other for co-operating with an adjacent disc insert. Each disc has a lug for engaging an adjacent disc and they are held against each other by a nut holding the assembly together.

The innermost disc has an interlocking dog to engage the spool. Compression forces on the spool due to tension in the seat belt webbing, compress the material in one or more discs to take up excess forces. The viscosity and volume of the deformable material, and also the relative sizes of the chambers can be chosen so as to determine the extent of the load limiting, including minimum and maximum levels.

According to a third aspect the force limiting means comprises an extrudable material contained within one chamber in a hollow compressible spool having two chambers therein communicating via one or more holes in a dividing member. Compression forces on the spool due to tension in the seat belt webbing, compress the material in one chamber forcing it through the hole or holes in the dividing member, into the second chamber. A bursting member may be used to seal the hole or holes to control the initial load. This could be in the form of a foil sticker or stickers in thin section. The viscosity and volume of extrudable material, and also the relative sizes of the chambers can be chosen so as to determine the extent of the load limiting including minimum and maximum levels.

According to a fourth aspect of the present invention the force limiting means comprises resilient biasing means acting between the spool and its axis of rotation, for example a coiled tension spring wound around a spool shaft coaxial with the spool, or a clock spring or springs operating in a similar manner to a normal retractor spring.

In such an arrangement there will be an initial preset torque in the spring which determines the minimum load at which limiting starts to occur. As the load increases beyond this minimum, the spring is wound up tight and the diameter of its centre bore decreases. A maximum force limitation occurs when the spring is wound tightly about the spool shaft.

Alternatively this arrangement could be used with a spring mechanism the centre bore size of which increases with increasing load up to a maximum determined by the size of the internal bore of the spool.

This aspect of the invention is particularly advantageous because the force limiting means is re-usable and is automatically reset after crash conditions have abated. After impact the restrained occupant rebounds off the belt into his seat. The taut spring then uncoils, rewinding slack in the belt webbing and satisfactorily restraining the occupant in the event of a second impact.

For a better understanding and to show how the same may be carried into effect, reference will now be made to the accompanying drawings in which:

FIG. 10 is a cross-sectional view of a retractor according to a fourth embodiment of the invention;

FIG. 11 is a cross-section of part of the retractor of FIG. 10, taken along line XI—XI;

FIG. 12 is a cross-sectional view of a retractor according to a fifth embodiment of the invention;

FIG. 13 is a cross-sectional schematic view of a retractor according to a fifth embodiment of the present invention;

FIGS. 14 and 15 are schematic views to the left (pretensioner) side and the right (mechanism) side respectively of the retractor of FIG. 13;

FIG. 16 is a graph of force against time for the load limiting retractor of FIGS. 13 to 15;

Like parts are denoted by like reference numerals throughout.

Figure 1:
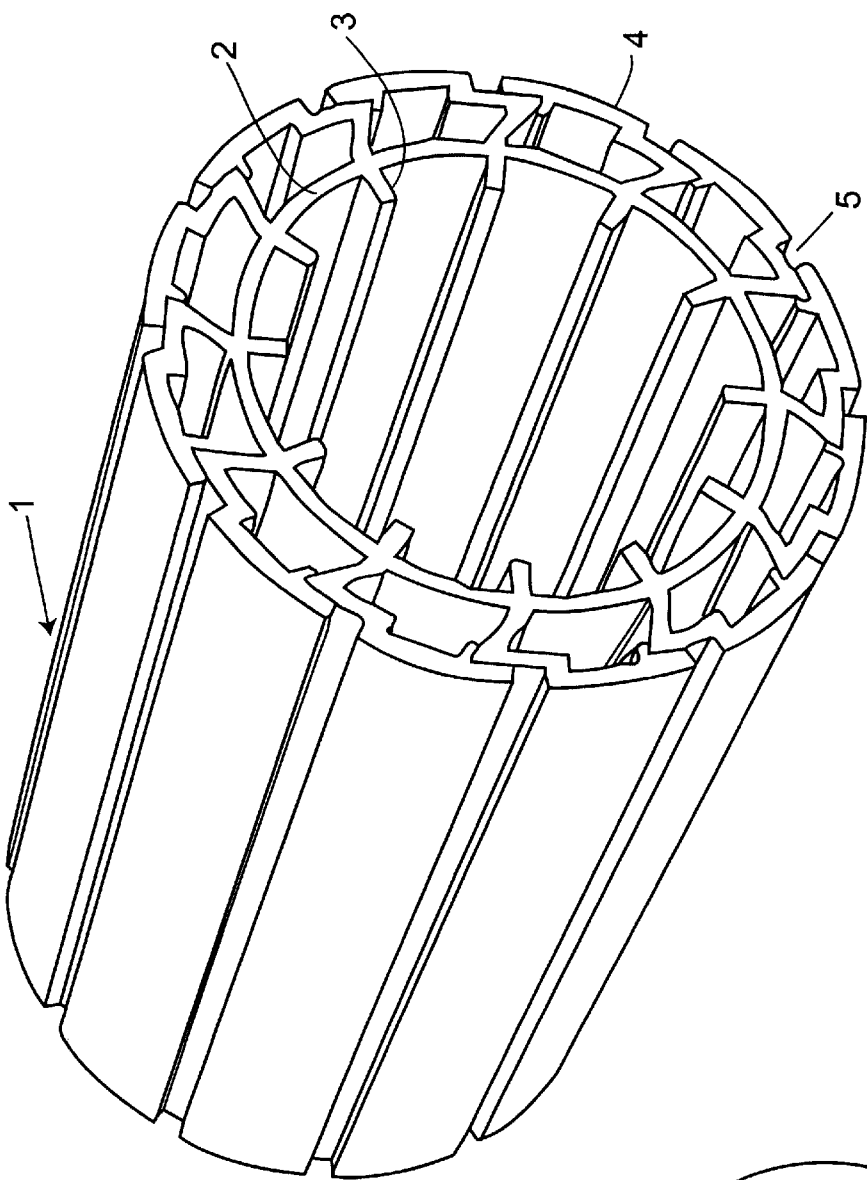
FIG. 1 is a perspective view of a spool for a retractor according to one embodiment of the present invention.

In FIG. 1 a hollow spool 1 is formed effectively as a double walled cylinder. An inner wall 2 has struts 3 extending radially inwardly towards the rotation axis or shaft of the spool (not shown). The outer wall 4 has longitudinally extending gaps 5 and is formed as ribs extending generally radially outwardly from the inner wall 2 and angled to provide outer wall portions extending in a direction circumferentially of the spool. The outer wall portions are stepped to support an adjacent wall portion on the circumferential surface thereof whilst providing clearance between adjacent ribs at the gaps.

Figure 2:
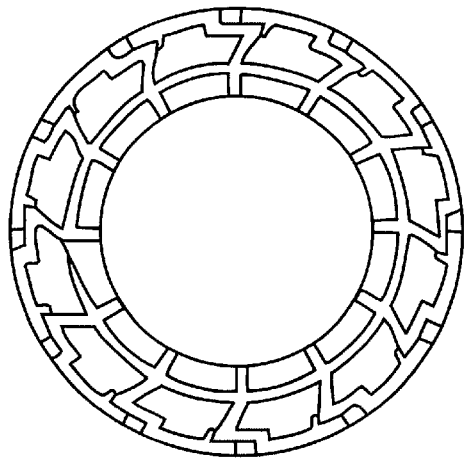
FIGS. 2 and 3 are cross-sectional views of the spool of FIG. 1 respectively before and after a load limiting operation has occurred.
Figure 3:
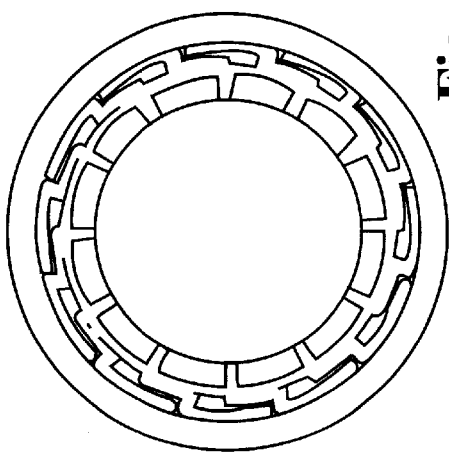

FIG. 2 is a cross-section of the spool of FIG. 1 under normal operating conditions. FIG. 3 shows the spool under loaded conditions, e.g. during a crash situation.

As can be seen from a comparison of FIGS. 2 and 3, under loaded conditions, as the seat belt is tightened, it compresses the spool 1 and the circumferential parts of the stepped ribs slide over each other until their ends reach the stops provided the adjacent step. This is the condition shown in FIG. 3 where the spool diameter is reduced under the load, resulting in a larger pay-out of webbing than would otherwise occur, thus limiting the force transferred to the vehicle occupant by the restraining webbing. In this condition the gaps 5 in the outer circumferential wall or layer are closed defining a maximum force limitation and preventing further collapse of the spool diameter and further spool pay-out.

Figure 4:
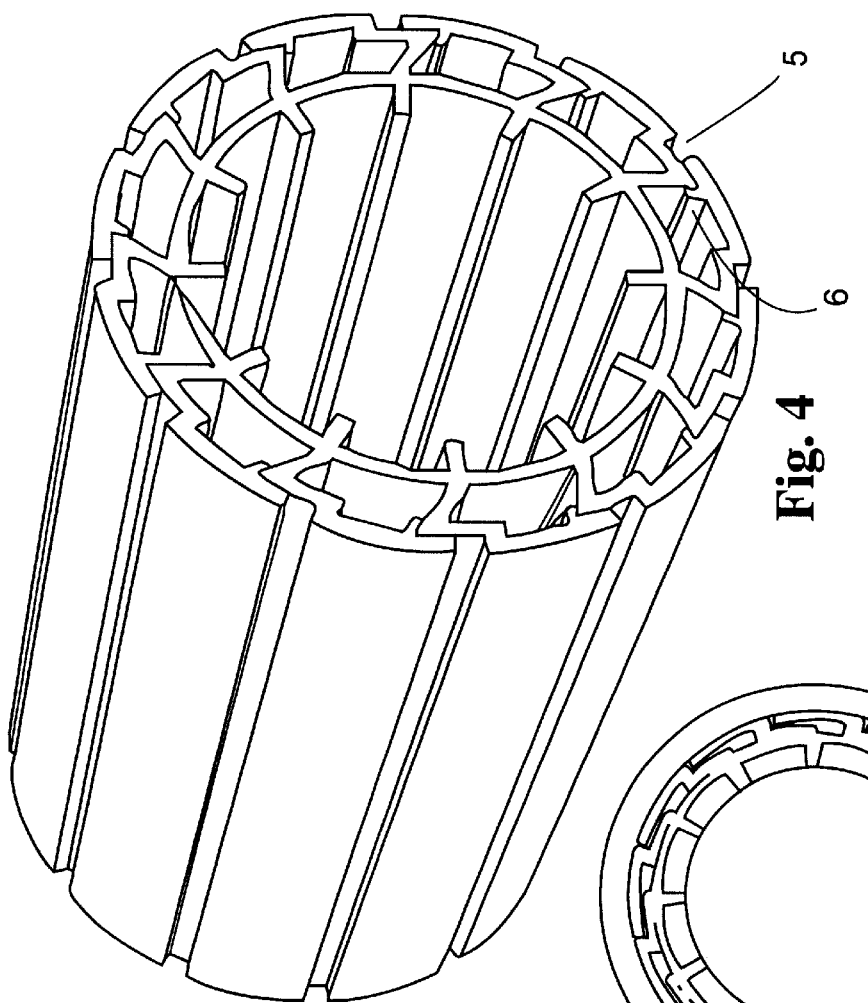
FIG. 4 is a perspective view of a spool for a retractor according to a second embodiment of the invention.
Figure 6:
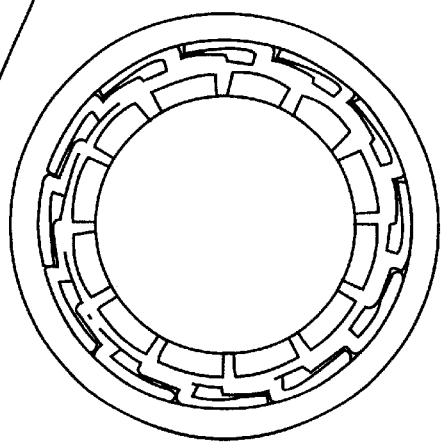
FIGS. 5 and 6 are cross-sectional views of the spool of FIG. 4 respectively before and after a load limiting operation has occurred.
Figure 5:
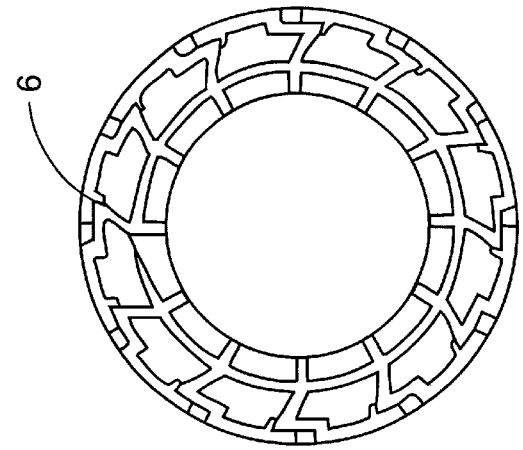

The embodiment of FIGS. 4 to 6 is an improvement on that of FIGS. 1 to 3, incorporating small fracture pins 6.

These fracture at a predetermined load and define the minimum force at which the force limitation is engaged.

Figures 8, 9:
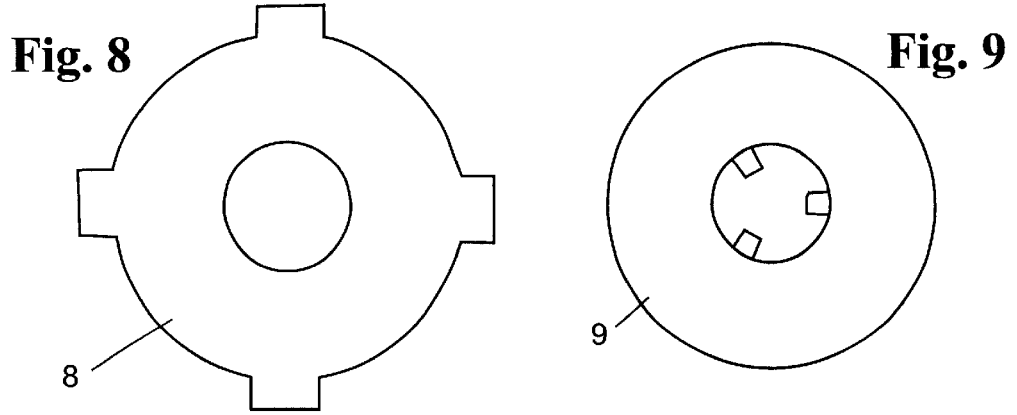
FIGS. 8 and 9 are cross-sectional views of parts of the retractor of FIG. 7, taken along lines VIII—VIII and IX—IX respectively.
Figure 7:
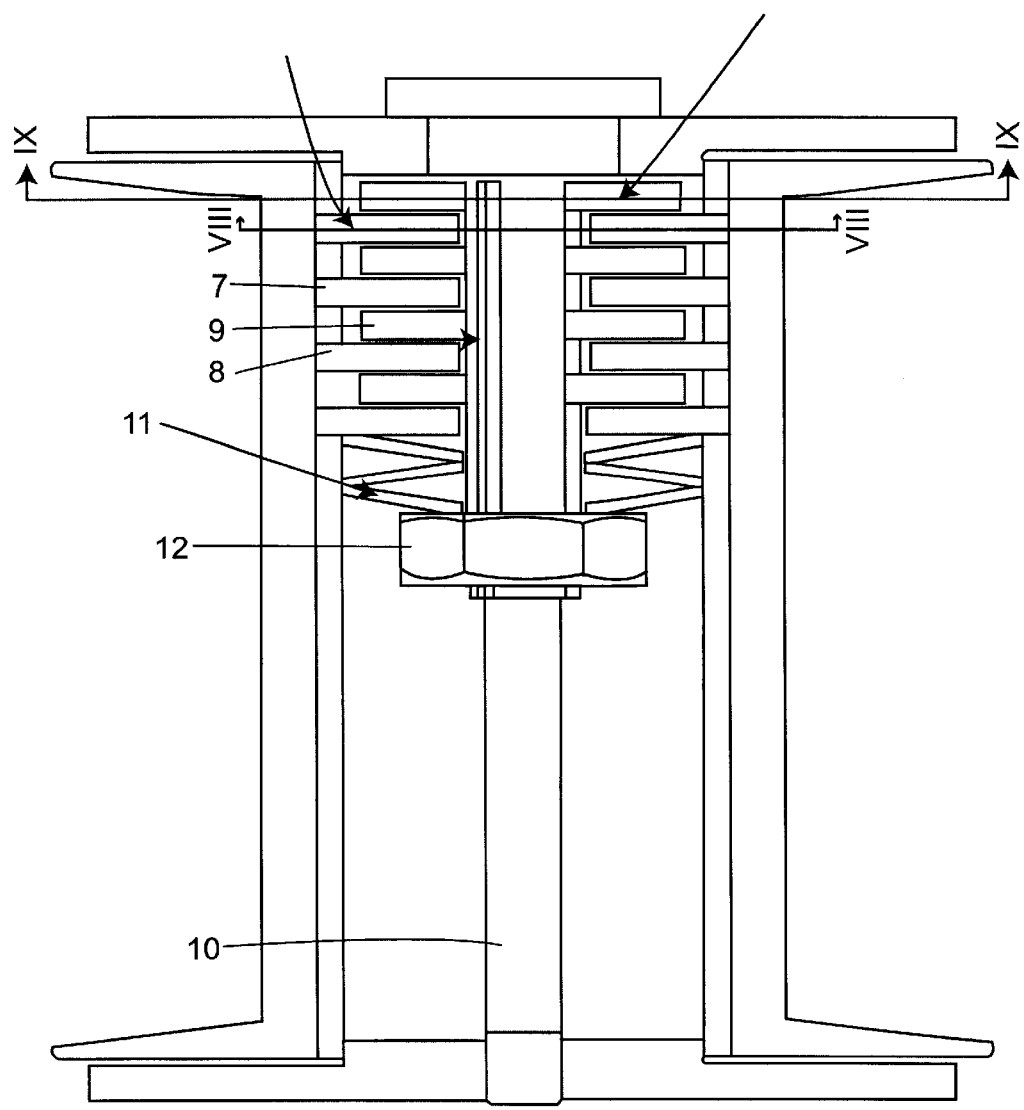
FIG. 7 is a cross-sectional view of a retractor according to a third embodiment of the invention.

In FIGS. 7 to 9 the force limitation is by way of a slipping clutch 7 between the spool 1 and the spool shaft 10. This is formed of alternating clutch plates 8 and 9 (shown in plan view in FIGS. 8 and 9 respectively). The plates are forced together by Belville washers 11 tensioned by a nut 12 threaded onto the shaft 10. A spring or simply the torque of the nut or a crush bush could replace or be used in combination with the washers to control the force applied to the clutch plates and thus the limiting load.

In an alternative embodiment (not shown) the nut is linked to the spool so that as it rotates relative to the shaft adjusting the clutch pressure, it increases or decreases the limiting load and acts as a load control feedback system.

In FIG. 10 the spool 1 has a hollow centre which comprises two chambers 13 and 14 separated by a perforated plate 15. An extrusion material is packed into one chamber 13 filling the space therein between the spool shaft 10 and the spool wall 1.

Under conditions where load limiting is required, when the seat belt webbing wound on the outside of the spool 1 is tightened, spool 1 is compressed, and the size of each of the chambers is decreased. This causes extrusion material 13 to be forced through the perforations 16 in the dividing disc 15, into the second chamber 14. The extent of the load limiting is determined by the viscosity of the extrusion material, by the size of the perforations and by the relative sizes of the chambers.

In FIG. 12 a torsion spring 17 is coiled around the spool shaft 10 within the hollow of spool 1. It is fixed at its ends 18 to the spool and at its middle to shaft 10 by pin or bolt 19.

In a crash impact the forward momentum of the occupant being restrained acts on the spool 1 to try to pay out more belt webbing. Since the shaft 10 is locked by a locking mechanism, activated by a crash sensor, then the relative rotation of the spool to the shaft tightens the spring 17 as more webbing is paid out, until the spring is coiled tightly around the shaft at which point pay-out ceases since the spool 1 is locked to the locked shaft 10.

When webbing tension is released as the crash conditions abate, the spring acts to rotate the spool in a rewinding direction thus drawing in the extra payed-out webbing together with any slack (which may have been caused by webbing stretch or by cinching of webbing on the spool). Thus the occupant is well protected against a second impact.

If the spring 17 is wound the opposite way then, as webbing is paid out in a load limiting operation, the spring will expand until it fills the spool 1, which defines therefore the maximum force at which load limiting operates. The spring will draw in webbing as it subsequently recoils itself.

FIGS. 13 to 15 show a retractor with spool 1 on which is wound belt webbing 22 and which is rotatably mounted on a shaft 10. A load limiter member in the form of a deformable hollow cylindrical tube 24 is mounted on shaft 10 between a bearing disc 25 and a nut 26 which is also mounted about shaft 10.

Rotation of the spool after it is locked, to prevent further webbing pay out in response to a crash sensor, causes nut 26 to rotate on the shaft 10 and move towards the hollow tube 24, thus compressing it between the bearing disc 25 and the nut 26. In FIG. 1 the tube 24 is shown in a compressed form being bulbous. The bearing disc 25 rotates with the spool and thus removes all torque from the crushable member, giving a more predictable performance.

FIG. 15 illustrates a main ratchet wheel 27 at the right hand (mechanism end) of the spool 1. Teeth 28 on the outer circumference of the main ratchet wheel 27 are engaged by a locking pawl when a crash situation is indicated to lock the right hand side of the spool 1. Wheel spokes 29 are constructed to deform under a predetermined load as shown in FIG. 15*a*, allowing torque to be transferred to the other end (spring side) of the spool 1, allowing locking teeth at the other end to engage and share the locking torque.

FIG. 14 illustrates the spring side of the spool 1 and shows spaced locking bars 30 mounted in carrier plate 31. During load limiting the relative motion between the spool 1 and the lockbar carrier plate 31 pushes the lockbars 30 radially outwardly to engage teeth on the retractor frame (not shown). This locks the left hand side of the spool 1 and thus the spool is locked securely at both sides after load limiting.

The sequence of operation is shown by the graph of FIG. 16 where line I represents the load on the main ratchet (mechanism side) and line II that on the secondary ratchet (spring side).

At the onset of the crash situation, the spool 1 is locked at A. As the load on the webbing increases due to the inertia of the vehicle occupant, the webbing is pulled tighter on the spool. This is known as cinching and is shown on the graph at B. When the webbing is fully tightened on the spool, the load transfers to the spool; and the load limiter comes into effect at C taking all the load on the main ratchet. At D the load limiter bottoms out and the main ratchet yields transferring some load to the other end of the retractor. The load on the secondary ratchet thus increases at this stage while that on the main ratchet remains fairly constant at E.

Figure 17:
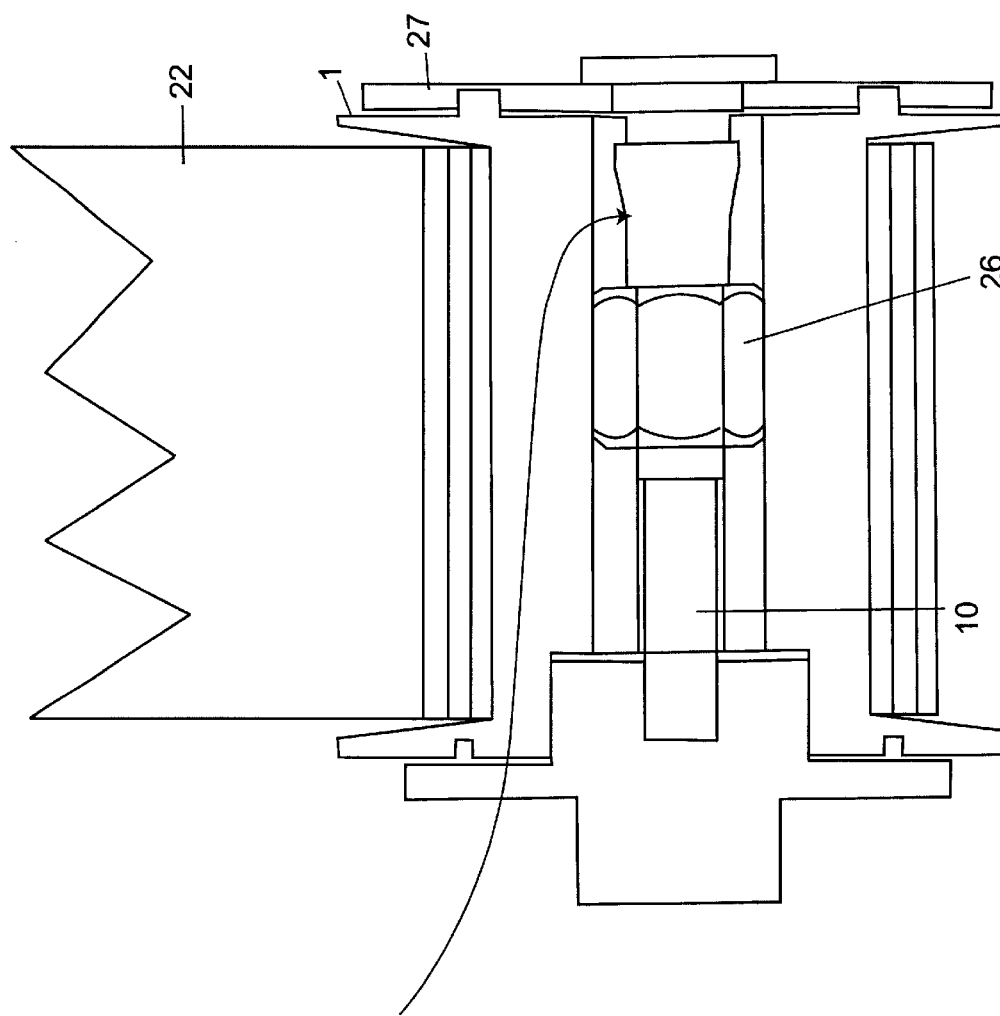
FIG. 17 shows a sixth embodiment of a load limiting retractor.
Figure 18:
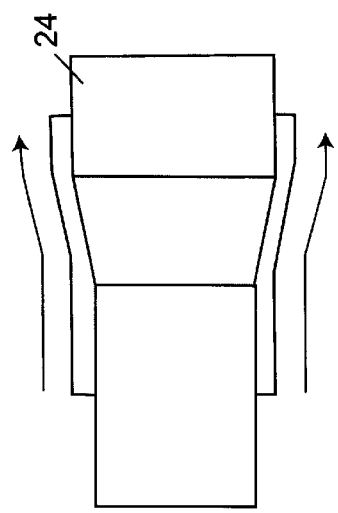
FIG. 18 is an enlarged view of part of FIG. 17.

FIG. 17 shows an alternative load limiting member in the form of a hollow conical tube 24. Like parts are denoted by like reference numerals and the function of the arrangement is identical to that for the arrangement of FIGS. 13 to 15. The hollow conical tube 24 expands radially when an axial force is applied. The shape of the conical tube 24 of FIG. 17 is shown in greater detail in FIG. 18.

The sequence of operation of this arrangement with a pretensioner will now be described.

When pretensioning begins, the spool 1 and the mechanism end main ratchet 27 are connected by shear pins and the ratchet 27 is locked by engagement with a lockbar (not shown).

As the pretensioner force increases, the shear pins break and the load limiter operates. All the load is at the mechanism end on the main ratchet 27 and the spring side (left hand side in FIG. 1) lockbars 30 are not engaged with the frame although they are driven outwards towards the frame.

When load limiting ceases the load on the spool increases causing deformation of the spokes 29 of the main ratchet 27. This allows the spring end locking bars 30 to contact the frame thus completing double-sided locking with a controlled sharing of the load between the two ends of the spool.

The construction of the spring side locking system (locking bars 30) can be varied to either maintain the spool locked after the pretensioning stroke, or to release it to run freely, as desired.

Figure 19:
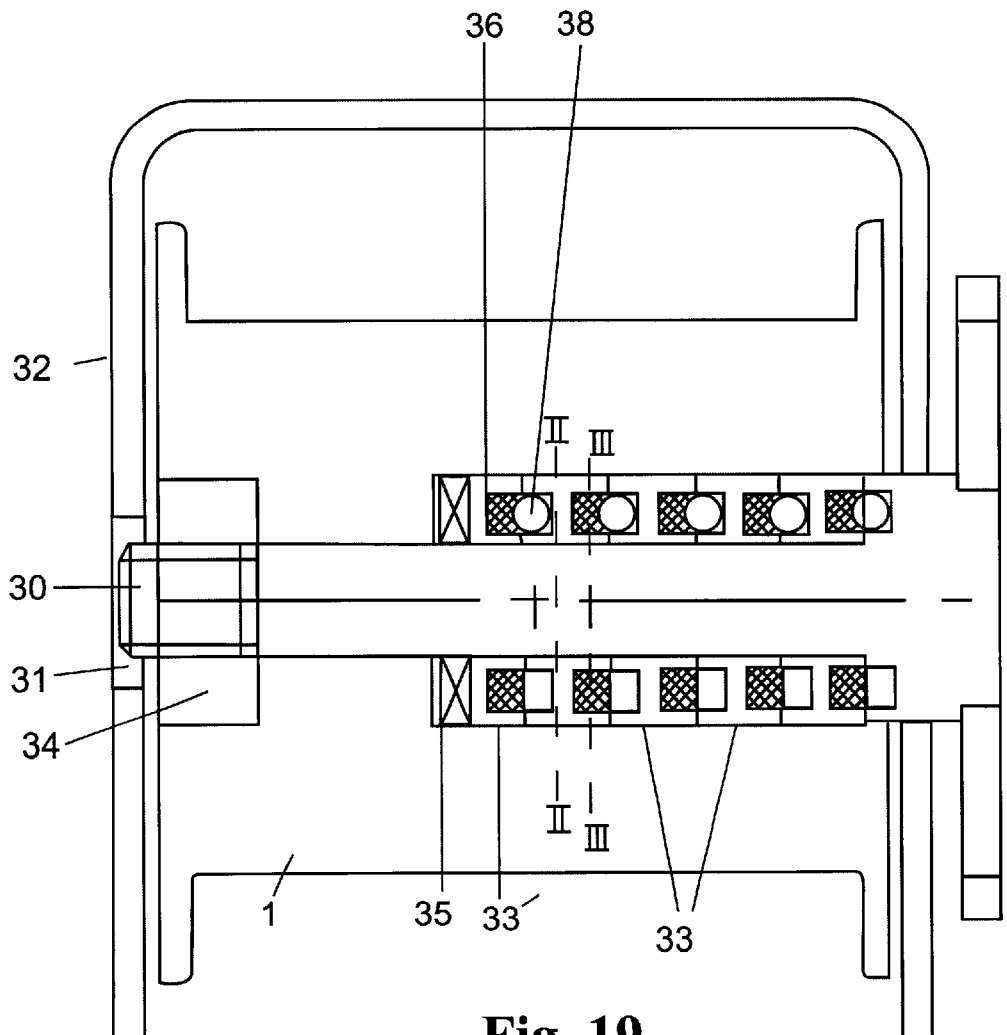
FIG. 19 is a cross-sectional view of a spool for a retractor according to a seventh embodiment of the present invention.
Figure 20:
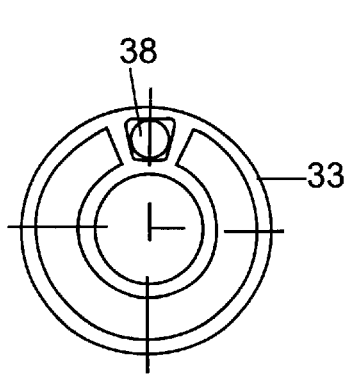
FIGS. 20 and 21 are views along lines II—II and III—III respectively of FIG. 19.
Figure 21:
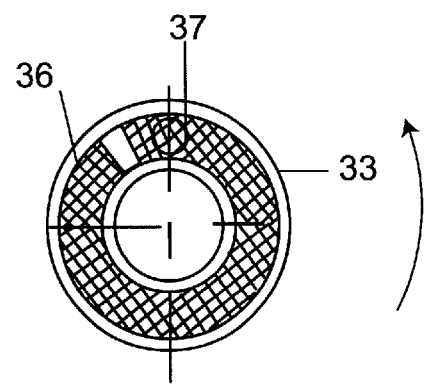

FIG. 19 shows a hollow retractor spool 1 mounted for rotation on a spool shaft 10 supported in bushings 31 in a housing frame 32.

Multiple discs 33 are mounted on the shaft 10 within the webbing spool 1 of a seat belt retractor mechanism.

This shaft 10 has the retractor's locking gear/ratchet permanently affixed. The discs 33 each have an insert of deformable material and a ball. The webbing spool is mounted on this shaft with the innermost disc 33' engaged to the spool 1 by locking dogs 35. The whole is held together by a nut 34. The nut thread is handed such that when the spool is under load the nut 34 will tend to tighten on the shaft.

The innermost disc 33' has locking dogs in one face to engage with the dogs 35 in the bore of the spool 1. The other face of innermost disc 33' accommodates a ball 38 from the adjacent disc. The face of each disc also has a raised lug (not shown) to engage in a circular slot in the adjacent disc, to hold the discs together. This slot is around the disc from the outside of the walls making up the socket for the ball. Each intermediate disc has a socket in one face for a ball 38 which protrudes to engage in the recess 37 in deformable material 36 in an adjacent disc 33. The shaft 10 has a similar socket for the ball and circular slot. The socket and slot features may be integral with the structure of the shaft 10 or may be part of a separate disc permanently affixed to the shaft 10. On operation of the retractor under crash conditions the shaft 10 is stopped from rotation by the retractor's normal locking mechanism. This new design allows the spool 10 to continue a loaded rotation. The spool 10 being engaged on the locking dogs of the inner disc and by the balls in the recesses of the discs' deformable material causes all the discs to rotate. Under the load induced the discs will tend to push apart and thus push the spool 30 up against the nut 31, thus tending to tighten the nut. If all the discs 33 have a similar insert material, then material in the intermediate disc nearest the locking gear/ratchet side (right hand side) of the retractor will start to be deformed by the ball in the shaft. The deformation will continue until the lug on this disc stops at the end of the circular slot in the shaft. At this point the material in the next intermediate disc starts to deform as in the previous disc and so on until the lug on the inner dog disc 33' comes to a stop. The spool 10 then ceases rotation. Alternatively with all discs having the same insert material they may all start to deform at the same time until full rotation of the spool is achieved. This design allows for the number of discs 33 to be varied according to the required rotation of the spool and also allows for varying loads by using a different insert material(s). If more than one type of insert material is used in the same assembly, then the discs with the softer material will deform first.

Figure 22:
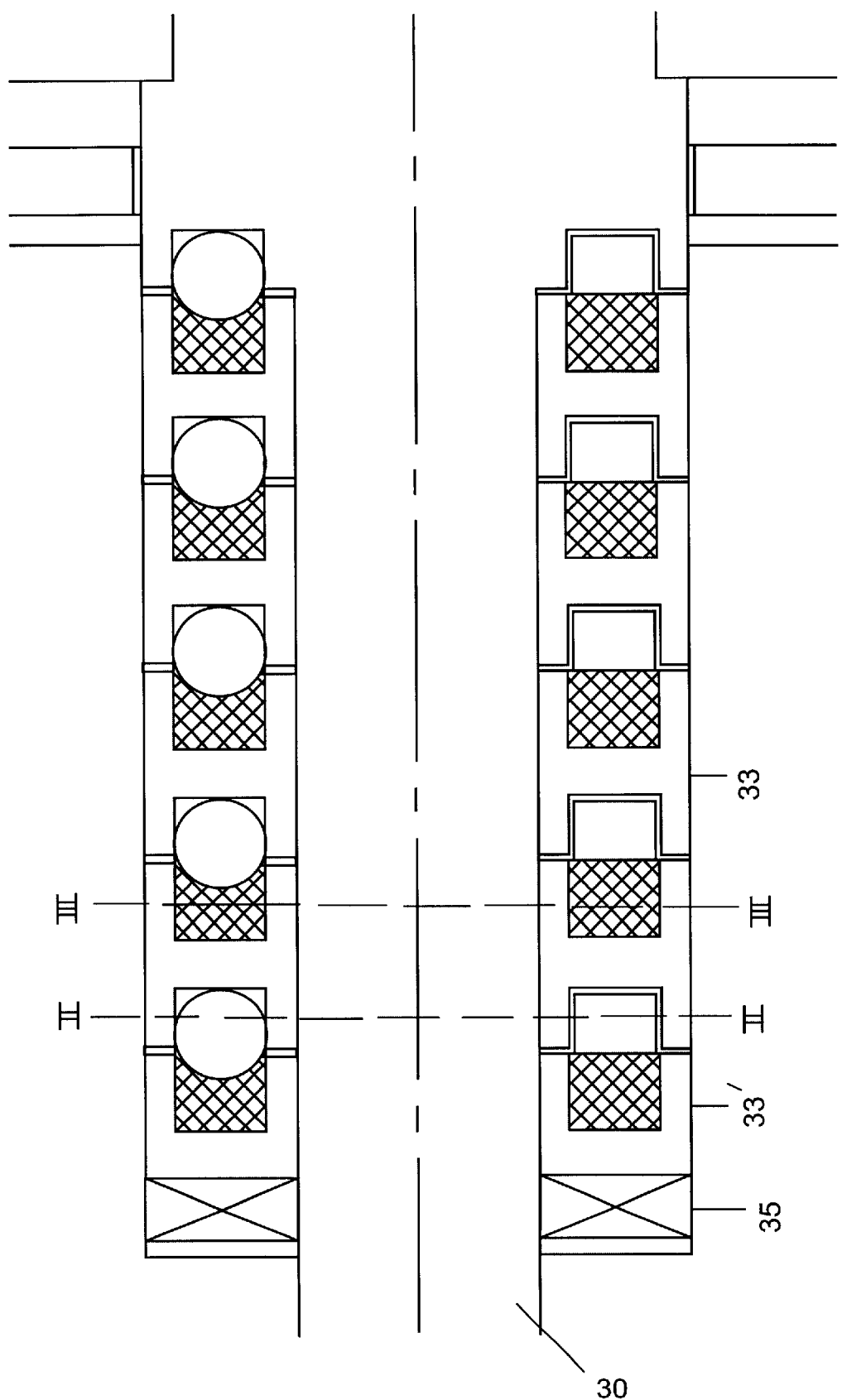
FIG. 22 is an enlarged cross-sectional view of part of the spool of FIG. 19.

In FIG. 22 an enlarged view is shown illustrating the discs 33 on the shaft 10 more closely.

In FIGS. 23 to 28 the force limitation is by way of slipping clutch plates 38 and 39 acting on transverse flange ends of the spool 1. The plates are forced together by a Belville washer 52 tensioned by a nut 62 threaded onto the shaft 10. A suitable Belville washer would be made from fairly hardened conical steel and be about 7.5 to 10 mm thick. This would deform around 1 mm under the large loads involved since these forces can rise to 2 tons-force (about 20,000 N). A spring or simply the torque of the nut could replace the washers to control the force applied to the clutch plates and thus the limiting load. A friction material 43, such as Jurid® 850 or 851 is shown in FIGS. 5, 9 and 10 interposed between the spool flange ends and the clutch plates 8 and 9.

In an alternative embodiment (not shown) the nut is linked to the spool so that as it rotates relative to the shaft adjusting the clutch pressure, it increases or decreases the limiting load and acts as a load control feedback system.

The clutch plate 38 has circular ribs 40 (FIG. 24) which interlock with ribs 41 on the spool 1 end surface. These ribs may be circular, trapezoidal or of other profiles. Both clutch plates 38 and 39 have non-circular central holes 42 (FIG. 7) for the shaft 10. This helps to stop the clutch plates spinning on the shaft 10.

Figure 23:
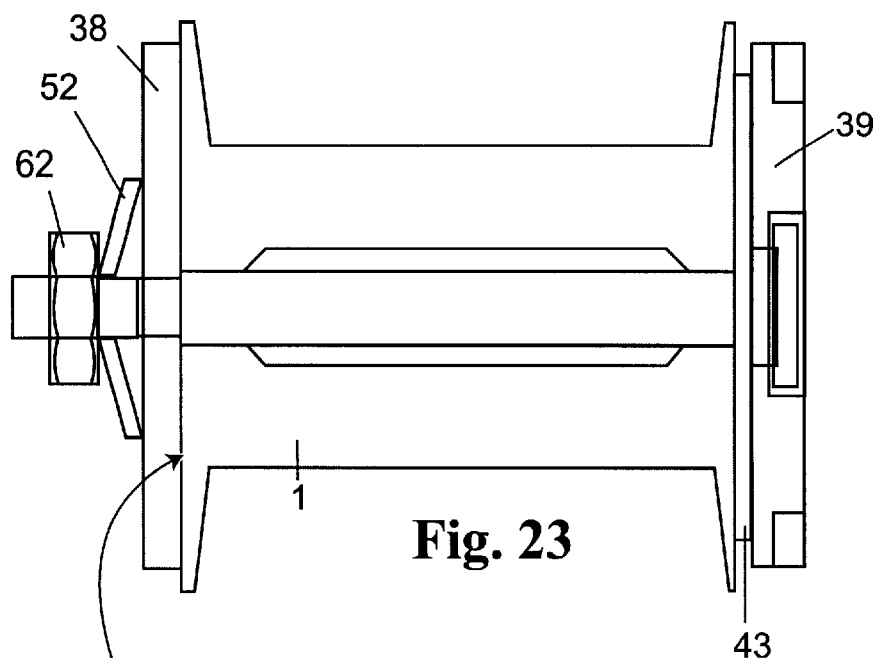
FIG. 23 is a cross-sectional view of a retractor according to an eighth embodiment of the present invention.
Figure 24:
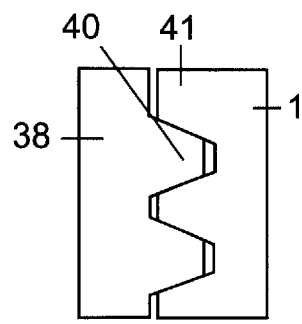
FIG. 24 is an enlarged view of a part of FIG. 23.
Figure 26:
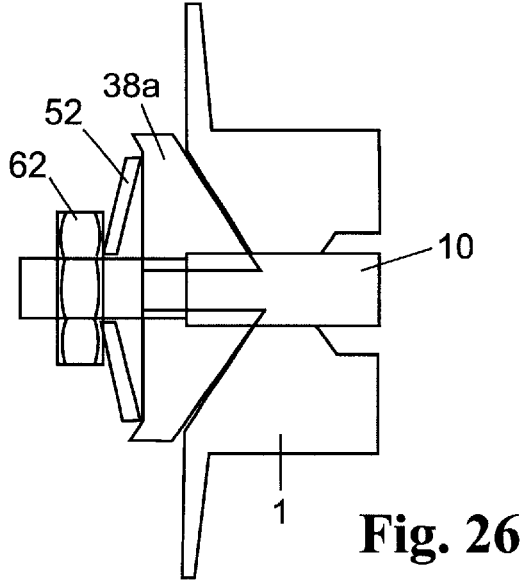
FIG. 26 is a cross-sectional view of part of a retractor according to the invention showing an alternative modification of the eighth embodiment shown in FIG. 23.
Figure 25:
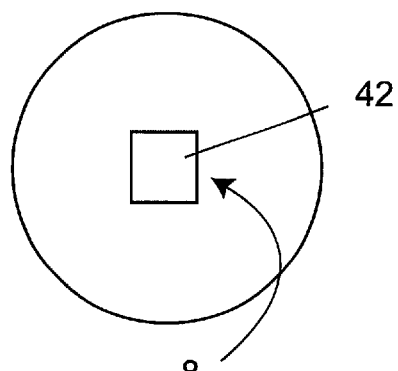
FIG. 25 is a plan view of apart of FIG. 23.

An alternative clutch is shown in FIG. 26 using a cone clutch 38*a* at either or both ends and which otherwise operates in the same way as the clutch of FIG. 23.

Figure 27:
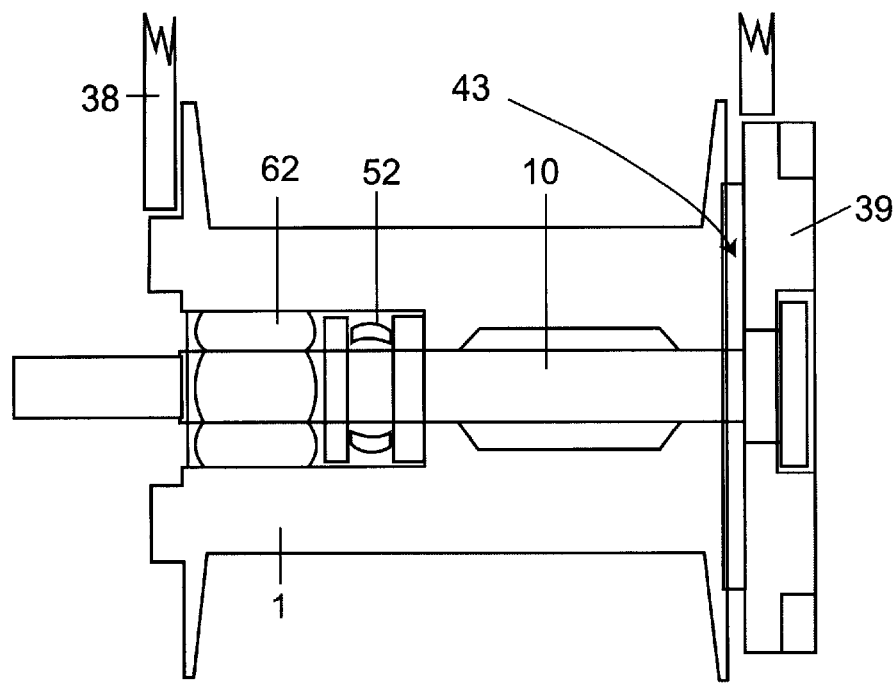
FIGS. 27 and 28 are cross-sectional views of a retractor according to two further modifications of the embodiment of the invention shown in FIG. 23.
Figure 28:
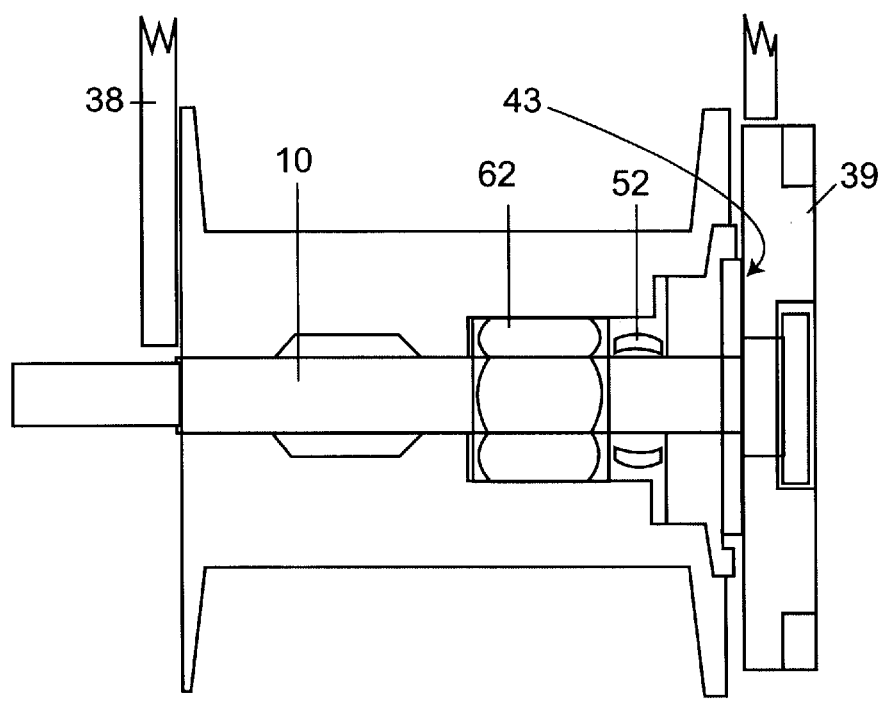

FIGS. 27 and 28 show a friction clutch with friction material 43 sandwiched between one end of the spool 1 and the clutch plate 39 (which may be a combined locking ratchet and clutch plates or a separate component), and wherein the Belville washer 52 and threaded nut 62 are located on the spool shaft 10 within the body of the hollow spool 1.

The friction force is controlled by the tension in the Belville washer 52 which is adjusted by nut 62 threaded on the shaft 30. The friction material will be chosen to optimise the required force limitation and may be Jurid 850 or 851. The friction can be further improved by keying, attaching or chemically bonding the friction material to one of the adjoining surfaces.

What is claimed is:

1. A seat belt retractor comprising a spool mounted on a spool shaft for rotation in the retractor,
    - a length of seat belt webbing wound on the spool for retraction or pay-out depending on the rotation direction of the spool;
    - means for locking the spool shaft against rotation when a crash condition is sensed;
    - force limiting means for allowing further pay-out of the seat belt webbing after the spool shaft has locked, under the influence of an occupant's forward momentum in the crash condition,
    - wherein the force limiting means is provided by a plurality of fins provided on the outer surface of the spool, each fin having a section which extends in a generally radial direction and a section which extends circumferentially, the circumferentially extending section of one fin overlapping the circumferentially extending section of an adjacent fin and are supported by the radial extending section of that adjacent fin, so that a force tending to tighten the webbing on the spool, acts in a direction to crush the radial sections of the fins and to slide the circumferential sections over each other, thus reducing the effective outer circumference of the spool.

2. A seat belt retractor according to claim 1 wherein the circumferentially extending fin parts are stepped so as to provide a predetermined stop for the sliding movement of the fins which provides for a minimum crushed spool size, and determines a maximum load limiting force at which pay out is allowed.

3. A seat belt retractor according to claim 1 wherein the fins are fixed in place relative to each other, in the undeformed spool, by shear elements, which shear elements determine a minimum force at which the load limiting comes into effect and provide a visual indication deployment.

4. A seat belt retractor according to claim 3 wherein the shear elements are formed of one of small ribs, pins and clips which fracture at a predetermined load which determines the minimum force.

* * * * *